United States Patent [19]

Goto

[11] 3,967,611

[45] July 6, 1976

[54] STRATIFIED-COMBUSTION TYPE INTERNAL COMBUSTION ENGINE WITH PRE-COMBUSTION-CHAMBER

[75] Inventor: Kenji Goto, Susono, Japan

[73] Assignee: Toyota Jidosha Kogyo Kabushiki Kaisha, Toyota, Japan

[22] Filed: Jan. 2, 1974

[21] Appl. No.: 429,891

[30] Foreign Application Priority Data

Aug. 9, 1973 Japan................................ 48-93113

[52] U.S. Cl. .................... 123/191 S; 123/DIG. 4; 123/32 ST; 123/32 C; 123/75 B; 123/32 SP
[51] Int. Cl.² ............................................ F02B 19/00
[58] Field of Search........... 123/32 ST, 32 SP, 32 C, 123/191 S, 191 SP, 75 B, DIG. 4, 37

[56] References Cited
UNITED STATES PATENTS

| | | | |
|---|---|---|---|
| 1,750,063 | 3/1930 | Sorg | 123/191 SP |
| 1,825,658 | 10/1931 | Dumanois | 123/32 SP |
| 2,011,992 | 8/1935 | Aseltine | 123/75 B |
| 2,121,921 | 6/1938 | Mallory | 123/75 B X |
| 2,179,143 | 11/1939 | Brown | 123/75 B |
| 2,242,990 | 5/1941 | Brown | 123/32 ST |
| 2,799,257 | 7/1957 | Stumpfig et al. | 123/32 SP |
| 2,826,187 | 3/1958 | Meyer | 123/191 SP |
| 3,195,519 | 7/1965 | Bishop et al. | 123/32 ST |
| 3,255,739 | 6/1966 | Von Seggern et al. | 123/32 ST |
| 3,283,751 | 11/1966 | Goossak et al. | 123/32 ST |

FOREIGN PATENTS OR APPLICATIONS

| | | | |
|---|---|---|---|
| 23,521 | 8/1966 | Japan | 123/32 ST |

Primary Examiner—Charles J. Myhre
Assistant Examiner—William C. Anderson
Attorney, Agent, or Firm—Woodhams, Blanchard and Flynn

[57] ABSTRACT

A stratified-combustion type internal combustion engine wherein a rich fuel-air mixture passage and an air passage both open into the main combustion chamber. A pre-combustion chamber is located adjacent to the main combustion chamber and communicates therewith by means of a connecting port which communicates with the main combustion chamber adjacent to the opening of the rich fuel-air mixture passage, whereby the rich fuel-air mixture is supplied to and burnt within the pre-combustion chamber.

3 Claims, 2 Drawing Figures

STRATIFIED-COMBUSTION TYPE INTERNAL COMBUSTION ENGINE WITH PRE-COMBUSTION-CHAMBER

FIELD OF THE INVENTION

The present invention relates to an improved type of the stratified charge internal combustion engine having an pre-combustion chamber communicating with the main combustion chamber for causing stratified combustion, thereby permitting desired performance under widely varying loading and operational conditions.

BACKGROUND OF THE INVENTION

To form the stratification of rich and lean fuel-air mixtures in the combustion chamber, conventional stratified-combustion type internal combustion engines require either the use of two carburetors or the use of a single carburetor combined with a direct fuel injection system. However, these systems have proven undesirable due to the overall resulting complexity of the fuel supply system.

Accordingly, the present invention relates to an improved stratified-combustion type internal combustion engine which eliminates the aforementioned disadvantage. Particularly, the present invention relates to a stratified-combustion type internal combustion engine which uses a single carburetor for the fuel supply system, whereby not only power control is possible, merely by adjusting the throttle of the carburetor, but whereby also the use of supercharge is made possible.

Particularly, the present invention relates to an improved internal combustion engine, as aforesaid, which is provided with a pre-combustion chamber which communicates with the main combustion chamber by means of a connecting port, which pre-combustion chamber receives therein a rich fuel-air mixture, which mixture is burnt within the pre-combustion chamber and expands into the main combustion chamber for producing a stratified-combustion which permits a single carburetor to function in an optimum and desirable manner under widely varying loading and operational conditions as imposed on the engine.

Figure 1:
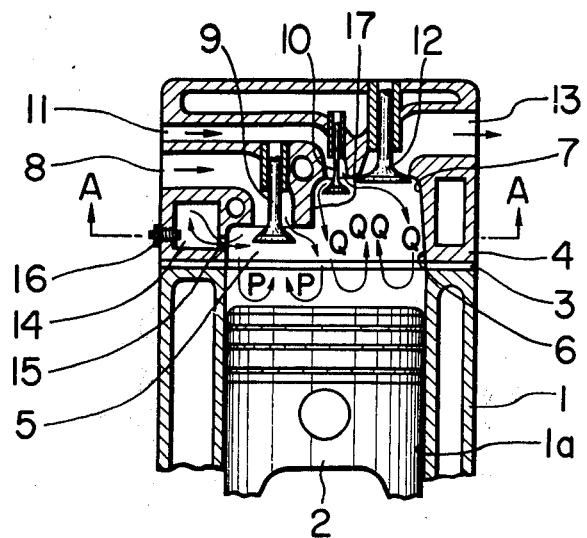
FIG. 1 is a fragmentary cross-sectional view of the end of a cylinder and specifically illustrating therein the improved combustion chamber structure of the present invention.

Certan terminology will be used in the following description for convenience in reference only and will not be limiting. For example, the words "rightwardly", "leftwardly", "upwardly", and "downwardly" will refer to directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

The objects and purposes of the present invention are met by providing an internal combustion engine having a main combustion chamber located adjacent to the one end of the cylinder. Both an air passage and a fuel-air mixture passage open into the main combustion chamber. The engine further has a pre-combustion chamber disposed adjacent to the main combustion chamber and in communication therewith by means of a connecting port. The connecting port opens into the main combustion chamber near the opening for the fuel-air mixture passage whereby the fuel-air mixture is supplied to and burnt within the pre-combustion chamber.

DETAILED DESCRIPTION

FIG. 1 illustrates therein a cylinder 1 which defines therein a cylinder bore 1a having a conventional piston 2 slidably positioned therein. The cylinder 1 is connected to a cylinder head 4 with a conventional gasket 3 being disposed therebetween. The cylinder head 4 has a recess therein which is aligned with the cylinder bore 1a and, in cooperation with the upper surface of the piston 2, defines the main combustion chamber 5. The main combustion chamber 5 is, in the illustrated embodiment, of a stepped form and includes a large diameter cylindrical portion 6 which is disposed directly above the upper surface of the piston 2 and the axis thereof parallels the longitudinally extending axis of the cylinder bore. The combustion chamber 5 also includes a small diameter cylindrical portion 7 which is formed in the cylinder head 4 and is of substantially smaller diameter than the cylindrical portion 6. The small cylindrical portion 7 is eccentrically offset with respect to the large cylindrical portion 6 and is defined by a wall 17.

The cylinder head 4 has a first passage 8 opening into the main combustion chamber 5, which passage 8 is for supplying a rich fuel-air mixture to the combustion chamber. The opening of the passage 8 is formed in the top wall of the large cylindrical portion 6 and communicates directly with said large cylindrical portion 6 at a location which is spaced from the small cylindrical portion 7. A conventional intake valve 9 is slidably supported on the cylinder head 4 and is provided for controlling the flow of fuel-air mixture through the passage 8 into the chamber 5, the valve 9 being provided to introduce the rich fuel-air mixture into the main combustion chamber.

The cylinder head 4 has a further passage 11 formed therein for permitting air to be supplied to the main combustion chamber 5. The passage 11 has the opening thereof formed in the top surface of the small cylindrical portion 7 so that said air passage 11 thus opens directly into the small cylindrical portion 7. An air intake valve 10 is slidably supported on the cylinder head 4 for controlling the flow of air through the passage 11 into the main combustion chamber 5. An exhaust passage or port 13 is also formed in the cylinder head 4 and is disposed so as to communicate directly with the small cylindrical portion 7 by means of an opening formed in the top wall thereof, which opening has a slidable exhaust valve 12 associated therewith for controlling the flow of exhaust gases from the combustion chamber 5 into the exhaust passage 13.

Figure 2:
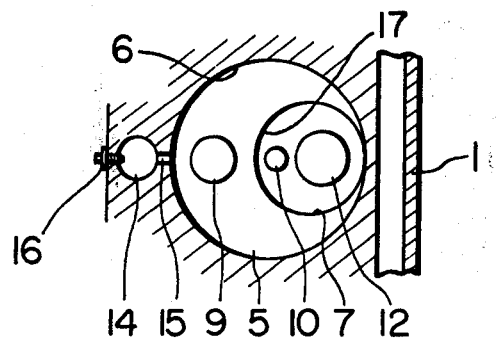
FIG. 2 is a sectional view taken substantially along the line A—A of FIG. 1.

The cylinder 1 also has a pre-combustion chamber 14 associated therewith and disposed adjacent to the main combustion chamber 5. The pre-combustion chamber 14 is separate from but communicates with the main combustion chamber by means small connecting port 15 which opens into the cylindrical portion 6 of the main combustion chamber 5 adjacent to the opening of the fuel-air mixture passage 8. The pre-combustion chamber 14 has a conventional ignition or spark plug 16 associated therewith. As illustrated in FIGS. 1 and 2, the pre-combustion chamber 14 is substantially smaller than the main combustion chamber 5.

OPERATION

The operation of the internal combustion engine constructed according to the present invention will be briefly described to insure a complete understanding thereof.

When the piston 2 descends, the rich fuel-air mixture is induced to flow into the combustion chamber 5 due to the negative pressure created within the cylinder bore. This rich fuel-air mixture flows from the passage 8 through the intake valve 9 into the main combustion chamber 5. The inflowing fuel-air mixture is deflected by the valve 9 so that it thus flows at a very high speed along the top and side surfaces of the main combustion chamber 5. Some of the rich fuel-air mixture as it flows along the side surface of the combustion chamber passes in the vicinity of the connecting port 15, which port is adjacent to the opening of the passage 8. Thus, due to an action known as "whistling," a stream of the rich fuel-air mixture flows from the main combustion chamber 5 through the connecting port 15 into the pre-combustion chamber 14. At the same time, the burnt exhaust gases remaining in the pre-combustion chamber 14 are expelled therefrom into the main combustion chamber 5 through the connecting port 15.

During the suction stroke of the piston 2, air is also sucked from the air passage 11 through the air intake valve 10 into the main combustion chamber 5. The inflowing air is deflected by the valve 10 so as to thus flow at very high speed along the side surface of the small diameter cylindrical portion 7, which flow occurs substantially as indicated by the arrows Q in FIG. 1, whereupon the inflowing air moves downwardly from the small diameter cylindrical portion 7 into the large diameter cylindrical portion 6. However, since the air passage 11 opens directly into the small cylindrical portion 7 adjacent the side wall 17 thereof, which portion 7 is spaced substantially diametrically opposite the connecting port 15 and is thus remotely spaced therefrom, the inflowing air from the passage 11 is deflected downwardly into the main combustion chamber 5 without flowing into the vicinity of the connecting port 15. Thus, the inflowing air does not flow into the pre-combustion chamber 14.

Further, the inflowing stream of rich fuel-air mixture which flows from the passage 8 through the valve 9 results in a portion of the inflowing fuel-air mixture being deflected by the valve 9 so as to flow at high speed along the upper surface of the large cylindrical portion 6 in a direction toward the small cylindrical portion 7. This deflected portion of the inflowing fuel-air mixture, which portion flows rightwardly in FIG. 1, impinges on the inflowing stream of fresh air which flows in through the passage 11 and is moved downwardly along the inner sidewall 17 of the small diameter cylindrical portion 7. This impingement of the fuel-air stream on the air stream results in both streams being deflected so that the rich fuel-air mixture flows outwardly and downwardly into the main combustion chamber substantially as indicated by the arrow P, whereas the air stream also flows downwardly and outwardly into the main combustion chamber as indicated by the direction of the arrow Q. The above described flow pattern of the incoming air and fuel-air mixture occurs in the cylinder during the suction stroke.

On the compression stroke of the engine, that is, during the upward movement of the piston, the above-described flow patterns are disturbed and disrupted so as to cause the rich fuel-air mixture and the air to be intermixed, thereby producing a substantially uniform but lean fuel-air mixture throughout the main combustion chamber 5.

Accordingly, this results in the pre-combustion chamber 14 being still filled with a rather rich fuel-air mixture, whereas the main combustion chamber 5 is filled with a lean fuel-air mixture which also contains therein the residual exhaust gas as previously expelled from the pre-combustion chamber 14.

As the piston 2 moves upwardly on its compression stroke and approaches its top dead center position, the rich fuel-air mixture within the pre-combustion chamber 14 is readily ignited by the ignition plug 16. The flames produced by the ignition of the rich fuel-air mixture within the pre-combustion chamber 14 readily discharge through the connecting port 15 into the main combustion chamber 5, thereby igniting the lean fuel-air mixture therein. By this means, the well known stratified combustion is achieved.

Generally, during the suction stroke, the valve 9 and the air intake valve 10 are opened substantially simultaneously, such as by the same valve timing mechanism. However, when compressed air is sucked from the air passage 11 into the combustion chamber 5 to effect supercharging, a sufficient quantity of air can generally be supplied to the combustion chamber even if the air intake valve 10 is opened for a shorter period of time than the intake valve 9. Therefore, the air intake valve 10 may be actuated to open after the opening of the intake valve 9, so that air from passage 11 is induced into the main combustion chamber 5 after the pre-combustion chamber has already been scavenged and filled by the rich fuel-air mixture supplied from the passage 8. This delayed opening of the valve 10 results in the pre-combustion chamber 14 being initially effectively filled with the rich fuel-air mixture, thereby preventing the admission of air into the chamber 14. Also, the supercharging of the engine through the supply of compressed air from the passage 11 permits the engine to successfully operate with a lean fuel-air mixture, since this not only increases the output but also prevents the misfire of the mixture through an increase in the pressure of the mixture.

While the above-described embodiment has the main combustion chamber constructed with a double-stepped cylindrical shape, nevertheless the object of the present invention could also be achieved by utilizing a main combustion chamber having other shapes, so long as the air sucked from the air intake valve is prevented from entering the pre-combustion chamber. For this purpose, the main combustion chamber could be provided with a deflecting surface therein which would be provided adjacent to the opening of the air suction passage for directing the inflowing air downwardly into the chamber, thereby preventing the inflowing air from communicating directly with the secondary chamber. Such a deflecting surface would thus be substantially equivalent to the inside cylindrical wall 17 defined by the small diameter cylindrical portion 7.

The present invention thus possesses the characteristics of both rich and lean fuel-air mixture combustions. It can not only reduce the quantities of harmful components of exhaust gases as unburnt hydrocarbon and nitrogen peroxide, but also improve the operating efficiency through an increase in the reaction rate of combustion. Also, by taking advantages of the action similar to whistling, the residual exhaust gases in the pre-combustion chamber are definitely scavenged which permits, in an engine having a single carburetor, the presence of rich fuel-air mixture in the pre-combustion chamber and the presence of a lean fuel-air mixture in the main combustion chamber. The above invention also allows a supercharging operation by introducing a small volume of compressed air from the air supply passage. This invention thus enables a widely varying number of desirable combustion operations to be performed while utilizing only a single carburetor associated with the cylinder means.

Although a particular preferred embodiment of the invention has been disclosed in detail or illustrative purposes, it will be recognized that variations or modifications of the disclosed apparatus, including the rearrangement of parts, lie within the scope of the present invention.

The embodiment of the invention in which an exclusive property or privilege is claimed are defined as follows:

1. In a combustion chamber structure for a stratified combustion-type internal combustion engine having a cylindrical bore with a piston slidably disposed therein, comprising a main combustion chamber defined by wall means and precombustion chamber which is separate from said main combustion chamber and communicates therewith by means of a small connecting port, the precombustion chamber being free of any intake valves, the main combustion chamber including a first substantially cylindrical combustion region which is defined by an axial end wall and a cylindrical sidewall which is substantially aligned with and effects an extension of said bore, said connecting port being formed in said cylindrical sidewall, a first passage communicating directly with said combustion region at a location closely adjacent said connecting port, said first passage terminating in a first port formed in said end wall and positioned closely adjacent said connecting port, first intake valve means associated with said first passage for controlling flow of a rich fuel-air mixture as supplied through said first passage to said main combustion chamber, said main combustion chamber including a second combustion region disposed in continuous communication with said first combustion region and projecting axially thereof in a direction opposite from said bore, said second combustion region having a cross-section substantially smaller than said first combustion region and communicating with said first combustion region adjacent a side thereof which is diametrically opposite from the location of said connecting port, a second passage communicating with said main combustion chamber for supplying air thereto, said second passage terminating in a second port which communicates directly with said second combustion region, said first port being located between said connecting port and said second port, second intake valve means associated with said second passage for controlling the flow of air therethrough to said main combustion chamber, a third passage communicating with said main combustion chamber and having exhaust valve means associated therewith for controlling the flow of exhaust gases from said main combustion chamber through said third passage, and an ignition device associated directly with said precombustion chamber for igniting the rich fuel-air mixture therein.

2. A combustion chamber structure according to claim 1, wherein said second combustion region is substantially cylindrical and is defined by a second cylindrical sidewall which is eccentrically positioned relative to said first-mentioned cylindrical sidewall and is spaced axially therefrom, said second cylindrical sidewall being of substantially smaller diameter than said first-mentioned cylindrical sidewall, said second combustion region also being defined by a second axial end wall which is displaced axially from said first-mentioned axial end wall, said second port being formed in said second axial end wall closely adjacent said second cylindrical sidewall at a location whereby said second port is approximately aligned with the central part of said first combustion region.

3. A combustion chamber structure according to claim 2, wherein said third passage terminates in a third port which communicates directly with said combustion region.

* * * * *

UNITED STATES PATENT AND TRADEMARK OFFICE
CERTIFICATE OF CORRECTION

PATENT NO. : 3,967,611
DATED : July 6, 1976
INVENTOR(S) : Kenjo Goto

It is certified that error appears in the above-identified patent and that said Letters Patent are hereby corrected as shown below:

Column 5, line 30; before "precombustion" insert ---a---.

Column 5, line 41; change "with said combustion region" to ---with said first combustion region---.

Column 6, line 44; change "with said combustion region" to ---with said second combustion region---.

Signed and Sealed this

Nineteenth Day of October 1976

[SEAL]

Attest:

RUTH C. MASON
Attesting Officer

C. MARSHALL DANN
Commissioner of Patents and Trademarks